US007890583B2

(12) United States Patent
Castro et al.

(10) Patent No.: US 7,890,583 B2
(45) Date of Patent: *Feb. 15, 2011

(54) ESTABLISHMENT AND MAINTENANCE OF COLLABORATIVE COMMUNICATION ASSOCIATIONS BASED ON MULTIPLE CONTEXTUAL CRITERIA

(75) Inventors: Paul C. Castro, White Plains, NY (US); Archan Misra, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/248,236

(22) Filed: Oct. 9, 2008

(65) Prior Publication Data
US 2009/0037534 A1 Feb. 5, 2009

(51) Int. Cl.
*H06F 15/16* (2006.01)
(52) U.S. Cl. .................. 709/204; 709/205; 709/206; 715/753; 715/754; 715/755; 707/662
(58) Field of Classification Search .............. 707/5; 709/204, 205, 227
See application file for complete search history.

(56) References Cited

U.S. PATENT DOCUMENTS

| 2002/0073208 | A1* | 6/2002 | Wilcock et al. ............. 709/227 |
| 2003/0135552 | A1* | 7/2003 | Blackstock et al. ......... 709/205 |
| 2004/0139157 | A1 | 7/2004 | Neely et al. |
| 2006/0080432 | A1 | 4/2006 | Spataro et al. |

OTHER PUBLICATIONS

"Avatar Movement in World of Warcraft Battlegrounds" —John L. Miller Microsfot Research IEEE 2009 http://research.microsoft.com/pubs/103338/johnmil-Netgames09.pdf.*
"Peer to Peer computing" —University of Texas http://www.edb.utexas.edu/minliu/multimedia/PDFfolder/PeerComputing.pdf.*
"Innovative Rated-Resource Peer to Peer Network" Abshishek Sharma and Hao Shi, IJCNC Mar. 2010 http://airccse.org/journal/cnc/10106.pdf.*

* cited by examiner

*Primary Examiner*—Joseph Thomas
*Assistant Examiner*—Randy Scott
(74) *Attorney, Agent, or Firm*—Whitham, Curtis, Christofferson & Cook, P.C.; Stephen C. Kaufman

(57) ABSTRACT

A method, system, and computer program for dynamically setting up collaborative associations between a group of users, computing resources, and/or communication devices, where the constituents of the collaborative association are chosen based on a variety of contextual criteria. The dynamic collaboration enabler component determines the explicit identities of the parties that should be a part of the collaboration. The group of individual entities involved in the collaboration can change dynamically during the lifetime of the collaboration, based on appropriate changes in the contextual data. Such contextual data refers to both state variables associated with the collaboration software or infrastructure itself, or to the state of entities external to the collaboration. The duration of the collaborative association is specified either explicitly or through a set of context related conditions. The dynamic context enabler can detect when the set of termination conditions is satisfied and then automatically remove the collaborative association.

2 Claims, 5 Drawing Sheets

Collaboration-ID: hiring-new@xyz.com
Explicit-Participants:
  john@xyz.com
  jenny@xyz.com

Implicit-Participants:
1. number=2;
   predicate: Manager(John)==true AND location.building=John.location.building 2. number=1;
   predicate: HRDept(John)=true and job.description=="specialist"

Implicit-Termination:
  predicate: vacancy.listing("finance-0101")=="filled"

ESTABLISHMENT AND MAINTENANCE OF COLLABORATIVE COMMUNICATION ASSOCIATIONS BASED ON MULTIPLE CONTEXTUAL CRITERIA

BACKGROUND OF THE INVENTION

1. Field of the Invention

The present invention relates to computer and telecommunications networking and collaboration middleware, where a set of two or more users or user devices are engaged in synchronous or asynchronous communication with one another. The present invention is specifically targeted towards the set of application scenarios, where this group of users is dynamically chosen based on certain criteria on the state of the users, and where the users can interact or collaborate with members of the group using an identifier that identifies this dynamic group. In particular, the membership of this group changes dynamically based on changes to the state of the users. The invention could be used in many collaborative scenarios, for example in healthcare, emergency response or corporate workflows, where the explicit identity of the individuals involved in some collaborative association is not important. Rather, it is required that certain dynamic attributes (such as the location or availability) associated with the individuals possess values appropriate to the task at hand. The selection of the individual users or devices then depends upon dynamically resolving who satisfies the specified criteria.

2. Background Description

Task-oriented collaboration between a group of users demonstrates a basic use of any telecommunications or computing network. This type of collaboration includes activities such as audio or video conferencing (using either circuit-switched or packet-based networks), use of collaborative software such as electronic whiteboards, or use of dynamically created repositories or databases (such as Lotus Notes Teamrooms). Current implementations of such collaborative or multi-party communication are oriented towards establishing a logical association between a well-defined set of people, whose identities are explicitly indicated to the collaboration-enabling application or utility at the beginning of the association. In such cases, the explicitly identified members of the logical group are informed of the means of interacting with other members of the group using off-line mechanisms (e.g., after an 800 number is established for a teleconference, the specified list of participants is then notified via an email).

Current systems are thus geared for:

1. manually forming or identifying the group of people who join a collaborative association (e.g., email mailing lists, LotusNotes teamrooms) or, 2. specifying a set of relatively static attributes as criteria that the members of the group must satisfy (all users whose last names begin with "Z") to be a part of the collaborative association. Once the collaborative association is formed, the group membership does not change, except without explicit manual intervention.

SUMMARY OF THE INVENTION

In many emerging collaborative application scenarios, such as emergency response and healthcare, there is a need to support models of collaboration where the explicit identity of the individuals is immaterial. Instead, it is necessary that one or more individuals be selected based on the satisfaction of a set of criteria relevant to the overall objective of the collaboration. For example, for rapid medical response to a patient, an emergency response dispatcher may wish to establish a collaboration (such as a voice call) between the patient's "EMS provider" and "the attending cardiologist at the nearest hospital". In this case, the individuals are identified based on their dynamically changing roles, or more generically, on their ability to satisfy certain criteria (such as a doctor presently being the attending physician or not at a particular hospital, EMS provider on duty or not, EMS provider for the particular patient or not, a particular hospital being the nearest one or not). Some of these criteria may be relatively static (an individual is designated as a cardiologist for a relatively long time), while others may be static (a cardiologist may be designated as the "attending doctor" every 6 hours, or the "nearest hospital" may change every 5 minutes due to changes in the patient's location).

Current collaboration or conferencing systems do not support such role or context-driven collaboration, where the participants in a collaborative association are not specified explicitly, but only implicitly through a set of attributes that the individuals must satisfy. For example, in a hospital setting, it would be advantageous to be able to setup a conference call between "the attending physician", the "head nurse on duty" and two "available cardiac specialists on call", rather than having to explicitly identify the individuals who satisfy these requirements (since the individuals change relatively rapidly over time). In general, it would be advantageous to have a system that would automate the process of identifying the explicit individuals needed for participating in a collaborative association. Such a system would take the requirements (or predicates) related to various attributes (such as the need to have the user "free for the next two hours", the need to have the user designated as an "expert in thoracic surgery") as input, and match or reconcile between dynamically varying "context" attributes of each individual (such as the user's location, the user's availability, the use's calendar information indicating any previously scheduled activity) and these requirements. Current systems can, at most, define a static identifier for a specific role, and then direct any communication intended for that role to this pre-defined identifier. For example, one can define a phone number "911" as fulfilling the role of an emergency responder—as different people staff the 911 phone response center at different times, a caller to 911 may interact with different individuals. However, the end-point of the collaboration context itself is static—there exists no means to direct an "emergency call" to the personal communication device (say cellular phone) of the individual currently fulfilling the role of "emergency responder", and subsequently migrating the call to another individual if the initial "emergency responder" becomes unavailable.

Accordingly, current collaboration systems do not dynamically alter the membership of the collaborative association (which defines who can interact with other group constituents in a specified fashion) over its lifetime to reflect changes in dynamically varying "context" attributes of the users. For example, current conferencing systems cannot support a conference call made to "all employees on the first floor," where a particular employee remains a part of the conference call only as long as the individual is on the first floor. In particular, an individual who enters the first floor at a certain instant of time should then become a member of the conferencing or collaboration session, and should cease to be a member of this session whenever he or she leaves the first floor. There is thus a need for an implementation of a communication between two or more participants, where the identities of the participants in the collaborative association are not either statically chosen at the beginning of the session, or explicitly identified, but vary dynamically as the "context" attributes of the user changes. These context attributes could include communication network-related parameters (such as the quality of the telecommunication link to the user's device, or the strength of the signal available to a wireless device) and network-independent parameters (such as the user's fatigue level as measured by bio-metric sensors, or their current workload). The combination of using network-related and network-independent attributes is fairly unique, since scenarios of collaborative computing usually involve the re-routing of communication endpoints only due to changes in network-related attributes (such as phone status, etc.)

The collaboration itself may be either asynchronous or synchronous or both. The invention is not concerned with the specific details of how different collaboration technologies work to link two or more explicitly identified communication endpoints, but instead of how the group of dynamically changing endpoints is actually determined. Examples of synchronous communication involve voice or video conference call setup, while examples of asynchronous association may include the definition of a new e-mail mailing list, or a task-specific database where access is restricted to the dynamically determined user set. In most such collaborative associations, the collaboration group itself is expressed through a technology-specific identifier that may be shared by all the collaboration participants (e.g., a common "800" number for voice calls, or a common "URL" for a shared Web-page).

One other failing of current conferencing systems is that they are not designed for instantaneous collaboration, where the conferencing or collaboration is proactively initiated by some network entity rather than requiring explicit action by the end users. This type of proactively initiated collaboration may be needed, for example, in medical emergency response scenarios, where the initiating network entity is a trusted and authorized agent that is capable of proactive connection establishment. Current collaboration systems typically use techniques such as email or instant messages to invite people to join a group. In many cases, where a certified authority controls the group formation decision, it may be more important to automatically connect the people using an appropriate technology (e.g., proxy-based voice conferencing, IP multicasting) to enable them to begin collaborating rapidly. Thus, this invention focuses on rapid, attribute-driven establishment of collaborative associations between the group of users who have been identified to be suitable for a specific task.

The notion of implicit identification of participants in a collaborative session (e.g., a phone conversation) has been documented in many prior publications. In this approach, the participants of a session are selected by a remote service, based on pre-established preferences and choices established off-line by a user. For example, USPTO disclosure 20030186716 (Dorenbosh et al.) describes a method by which the remote service identifies the units located "nearby" the caller, and connects all those units in a conferencing session. Unlike the present invention, these approaches do not a) consider dynamic addition and deletion of users to a session based on continued monitoring of attributes of users during the session, b) provide methods by which the session is established by an external request (rather than a participating caller).

Role or attribute based collaboration mechanisms have also been proposed or described in some earlier work. However, in all these cases, the attributes used to identify participants in the session are part of the session-establishing technology (i.e., attributes refer to the state of the Collaboration Network or Application Entity (CNAE)) alone. For example, USPTO disclosure 20020078150 (Thompson et al.) describes a method for establishing a collaborative session among individuals, where the mode of collaboration chosen (e.g., email, Voice-over-IP phone call) is chosen dynamically based on the "presence" (dynamic network state) of each individual's devices. USPTO disclosure 20020075304 (Thompson et al.) presents an application based on this method. USPTO 20020078150 in particular does not address the notion of attribute-driven implicit identification of the participants of a collaborative session; it assumes that the participant list is explicitly available. Even if this list were to be implicit, this category of inventions does not consider the fact that the criteria for inclusion in the collaboration can refer to attributes external to the CNAE. Such attributes (e.g., whether a physician has another operation scheduled or not) are not obtainable from the network itself, but refers to information that is stored in external information systems. The invention thus generalizes the idea by using a single Context Information Provider Engine (CIPE) engine, which can provide information from a variety of systems, including but not limited to the CNAE. Moreover, as before, the notion of event-driven continuous monitoring of this attribute set, and the resultant modification of the set of participants, is a unique feature of the subject invention.

USPTO disclosure 20020073150 presents a method of associating parties with communication sessions. Here too, the basic idea is to have a connecting user describe his preferences, and then have a session manager look through the list of current sessions, and place the user in the appropriate session. Alternatively, a new session is created, the connecting user is placed in the session, and additional available users are added to this session. The central idea is to have descriptive attributes associated with sessions, rather than with individual users, and then have users specify collaboration preferences in terms of predicates over these session attributes. (As an example, a user may look to join an existing "biking in New York" session, in a similar manner that users join chat rooms established for specific topics. Of course, chat rooms are established statically.) This approach does not use attribute-based predicates on both network-internal and network-external state to identify session participants, and does not provide continuous monitoring on these attributes to dynamically add or delete participants in the session.

USPTO disclosure 20030112956 (Brown et al. from IBM) presents a method for automatically redirecting a call made by a caller to a callee to one of several backup numbers for the callee, based on the call's context. This approach implies the philosophy that a call description contains descriptive attributes. However, while 20030112956 expresses attributes on the call (e.g., "this call is for a medical query"), the present invention expresses predicates over attributes on the other participants (e.g., call needs a "cardiac surgeon") of the session. Furthermore, 20030112956 assumes that the list of potential backup numbers to which the call may be redirected is established a-priori and explicitly enumerated, whereas in the present invention, the other participants in a session (either two-users or multi-user) are chosen dynamically and can vary based on the contextual attributes of the users.

An exemplary object of the present invention to provide a method to dynamically determine and/or change the participants in the association based on dynamically changing attributes of the users.

Another exemplary object of the present invention is to allow participants or users of a synchronous session to be specified through implicit predicates on their attributes rather than on explicit identification of the participants.

The invention allows the predicates to be specified over attributes that refer to both the state of the CNAE (i.e., the telecommunication network or software over which the synchronous session is enabled) and to the state of elements that are external to the CNAE.

Another exemplary object of the invention is to provide the ability to dynamically add or remove users from an ongoing collaboration context in response to changes in the dynamically varying attributes of the users.

The invention also provides a method for establishing the collaboration session between a group of designated users automatically, proactively by the DCE rather than being activated by the users.

The present invention addresses the above-mentioned limitations of systems that establish collaboration associations (communications-oriented or otherwise) by defining a method to dynamically determine and/or change the participants in the association based on the dynamically changing attributes of the users.

One aspect of the invention is to allow end users or software applications to specify the participants or users of a synchronous session via implicit predicates on their attributes (e.g., connect me to someone "who has the next hour on his calendar free" or whose "instant messaging status equals 'active'"), rather than via explicit identification of the participants (e.g., connect me to "Joe"). In this approach, users interface to a software entity, which we shall call the Dynamic Collaboration Enabler (DCE) by indicating the required set of individuals and their associated set of attributes. The DCE is then responsible for first resolving the identity of appropriate individuals who currently satisfy the relevant requirements (i.e., someone whose "next hour is indeed free on their calendar"). This resolution is done by determining the identity of users, devices or communication endpoints, which satisfy the predicates defined over the set of attributes. In many practical embodiments of the invention, the attributes of concern will involve so-called "contextual" attributes, or attributes about the user or the user's computing device (such as the user's current location, his daily activity calendar, the weather on his current driving route, the battery power level on his mobile device) that vary fairly dynamically over time. To enable the DCE to determine the identity of appropriate individuals, the DCE must interface to a separate Context Information Provider Engine (CIPE) that retrieves up-to-date copies on the relevant contextual attributes, and is also able to resolve appropriate queries over such attribute values (e.g., "which user has the ROLE attribute equal to DOCTOR and CURRENT_LOCATION attribute equal to HOSPITAL"?). After determining the identity of the individuals or devices, the DCE will then interface with the conventional collaboration system that takes explicit individuals or devices as inputs, and connects them in the appropriate manner. This conventional collaboration-enabling component is referred to herein as the Collaboration Network or Application Entity (CNAE). CNAE can refer either to a telecommunications infrastructure (e.g., for supporting a voice-based conference call, the CNAE would refer to the computing system that sets up voice conference calls on a telephony network, while for an email-based interaction, the CNAE would refer to the email server system that sets up a new task-specific mailing list). The CNAE itself is thus a logical representation of a variety of collaboration-enabling technologies, implemented either in a single server or through a set of distributed communication protocols, such as the Session Initiation Protocol (SIP).

This invention has a focus on scenarios where the user or device identifier used to form the collaborative association is itself a generic one, i.e., one which has not been defined solely for fulfilling a specific role or objective. In particular, the CNAE utilizes a user or device identifier that has been already established for generic communication, and not one that is statically pre-determined for a specific role. For example, in a telephony context, the CNAE would identify appropriate phone numbers to connect in a conference call, where the phone number for a user could correspond to the user's cellular phone number. This is distinct from existing approaches where a distinct identifier or number is set aside precisely for a specific role (e.g., "911" is designated permanently for a specific purpose, namely, emergency reporting). Thus, while existing approaches to role-based collaboration involve the ahead-of-time one-to-one mapping from role to collaborative identifiers, this invention focuses on the dynamic (requester-initiated), context-driven, mapping of collaboration requirements to generic user or device identifiers.

Another aspect of the invention relates to the type of context information and attributes over which the user or software application can specify its set of predicates. The invention allows the predicates to be specified over attributes that refer to both the state of the CNAE (i.e., the telecommunication network or software over which the synchronous session is enabled) and to the state of elements that are external to the CNAE. In an embodiment of this invention, the collaboration is set up via means of a conference or multi-party session over a telecommunications network. This session could be circuit-oriented (as in the conventional telephony network) or packet-based (as in packet-based or Voice-over-IP/SIP telephony networks). In this case, some of the context-predicates can refer to properties of the telecommunication network and the end devices—for example, specifying predicates that "the device has high battery power, AND the device is connected not to a roaming network but its home network". Additional or alternative predicates can refer to information that is not obtained directly from the CNAE but determined via alternative means. For example, the predicates could also be of the form "the user's blood pressure level is low AND the user is not on vacation". Such information is not part of the CNAE, but is instead determined by additional software communicating with appropriate context data sources over a communication network. This invention allows both CNAE-state related and CNAE-external attributes to be specified as part of the specifications used by the DCE to identify an appropriate candidate user or associated communication device. To express constraints over both types of attributes, the CIPE must retrieve information from CNAE-specific entities (e.g., in the case of an email-based mailing list, this information is retrieved from a mail server) as well as from external components providing additional contextual data. This form of dual retrieval can be achieved by the use of specialized "adapters" within CIPE that connect to and communicate with the CNAE, as well as other forms of contextual data sources.

Yet another aspect of the invention relates to the ability to dynamically add or remove users from an ongoing collaboration context in response to changes in the dynamically varying attributes of the users. To continuously monitor changes to the context attributes, the DCE establishes a long-lived association with the CIPE, which proactively reports changes of interest in the context data (similar to an event-notification paradigm). Alternatively, the DCE may, at appropriately defined intervals, query the CIPE for the latest relevant context data, and then decide on whether the data has changed sufficiently for the DCE to alter the group of users participating in the collaboration context. These changes could be triggered based on changes in either the CNAE context data (a multi-party Voice-over-IP conferencing session between "users with open laptops" could remove an existing participant who closes network connectivity), or alternative context data (the conferencing session removes a participant who closes his or laptop computer cover). This ability to modify the users within an ongoing collaborative association also allows the DCE to follow up the removal of a user with the proactive addition of one or more alternative participants, whose current attribute values satisfy the defined context predicates. For example, when the "currently available" doctor's cellular phone gets disconnected from the multimedia session between "an available doctor" and the patient "Joe", the DCE will query the CIPE for an alternative "currently available doctor" and connect the newly identified individual to the patient's call. Whenever the set of users participating in the collaborative grouping changes, the DCE may optionally transfer, create or modify the information available to one or more users in the collaboration. Techniques for providing such "initial bootstrapping" information in a collaboration context have been described previously and are known by those skilled in the art. The actual technique for bootstrapping users can vary considerable within the practice of the present invention.

Yet another aspect of this invention relates to establishing the collaboration session between a group of designated users automatically, that is, proactively by the DCE rather than being activated by the users. As an example of this, a conferencing call request to the DCE may require an association between "2 cardiac surgeons presently in the hospital, a patient's designated nurse and the patient's family member in the hospital". The DCE could then proactively take a variety of proactive steps for establishing the collaboration context, as appropriate for the chosen CNAE. For example, in the voice-conferencing scenario, the DCE could initiate a conference call invitation, first setting up the conference call resources and then sending users the appropriate identifier of the conference call session, thereby inviting them to join the conference call. In an online file-sharing (e.g., Lotus Teamroom) scenario, the DCE could first create a Teamroom with the appropriate users as members, and then send individual users pointers to the appropriate Teamroom identifier. Similarly, the DCE could use the appropriate underlying technology to dynamically add new users or remove existing users from the collaborative association during the lifetime of the association.

BRIEF DESCRIPTION OF THE DRAWINGS

The foregoing and other objects, aspects and advantages will be better understood from the following detailed description of a preferred embodiment of the invention with reference to the drawings, in which:

FIG. 3 shows the logical structure of the requester query, that is used to initiate the implicit context or role-based collaborative association. Possible fields in such a requester query include a set of explicit identifiers (who are required to be a part of the collaborative association irrespective of their context), a set of implicit predicates over context attributes, an identifier used to refer to the established collaborative association, and another set of implicit predicates used to define event-based termination of the collaborative association.

DETAILED DESCRIPTION OF A PREFERRED EMBODIMENT OF THE INVENTION

Figure 1:
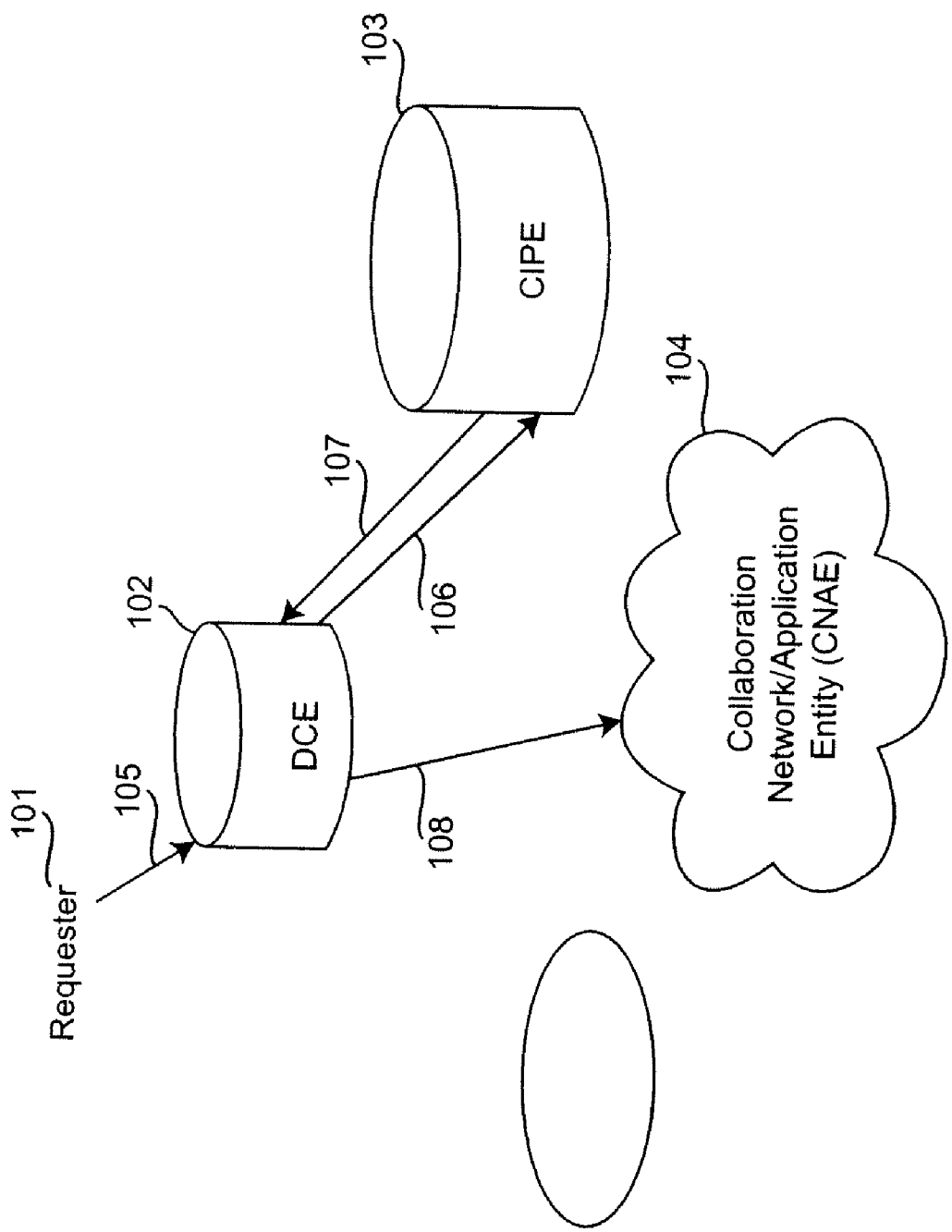
FIG. 1 shows the functional elements needed to implement the inventive model of context-driven implicit identification of the individuals or identifiers that define a common group established for a specific objective.

The following description details how the present invention is employed to first, dynamically identify the set of user or device identifiers that satisfy various contextual predicates, and subsequently, establish a collaborative association between these user or device identifiers. Throughout the description of the invention reference is made to FIGS. 1-4. When referring to the figures, like structures and elements shown throughout are indicated with like reference numerals.

FIG. 1 shows an exemplary environment embodying the present invention. The figure sets forth the basic steps and the functional elements that are needed to achieve the context-driven collaborative association. The requesting user or application 101 first communicates with the Dynamic Context Enabler (DCE) entity, specifying 105 the implicit set of users that need to be involved in the collaboration. This specification is typically done in terms of the different numbers of users belonging to different predicate groups, where each predicate group is defined as a collection of predicates over contextual attributes. The DCE then communicates 106 with one or more Context Information Provider Engines (CIPE) to query for individuals who currently satisfy the context-related predicates expressed as part of the initial role-group specifications 105. In response to these queries, the CIPE modules will return 107 the device or people identifiers that meet the criteria expressed in the query 106 from the DCE to the CIPE. The DCE is then responsible for orchestrating the actual instantiation of the collaboration among the identified individuals. The detailed steps taken to set up the collaborative session between the individuals depends on the collaboration tool and medium (e.g., voice conference call, a common database, a common email mailing list etc.). Some of the embodiments of the actual establishment of the collaborative session are discussed in more detail below in order to illustrate the types of steps actually involved in the collaboration establishment. In general, the DCE will have to interface to Collaboration Network or Application Entity (CNAE) component 104 that actually instantiates a collaborative association among a given set of identifiers. The DCE will provide 108 to the CNAE the set of specific identifiers that it desires be a part of the collaborative association. In case the collaborative association requires other parameters, such as a separate temporary identifier for the collaborative association itself, the DCE may provide such parameters to the CNAE as well. For example, if the collaborative association involves a voice teleconference, the CNAE component will refer to the telephony utility that sets up a conference call between a set of phones. In this case, the DCE will provide the phone numbers (or the names of the phone owners) to the CNAE. In case the conference call is via a conferencing bridge (e.g., an 800 number), the DCE, may as a possibility, specify the number of the conferencing bridge as well.

To enable the identification of individuals based on the appropriate matching of their current contextual data to the predicates expressed in the collaboration setup message, the CIPE needs to be able to both retrieve such contextual data from a variety of sources, and then process the predicate-based queries from the DCE to find the matching sources or individuals.

Figure 2:
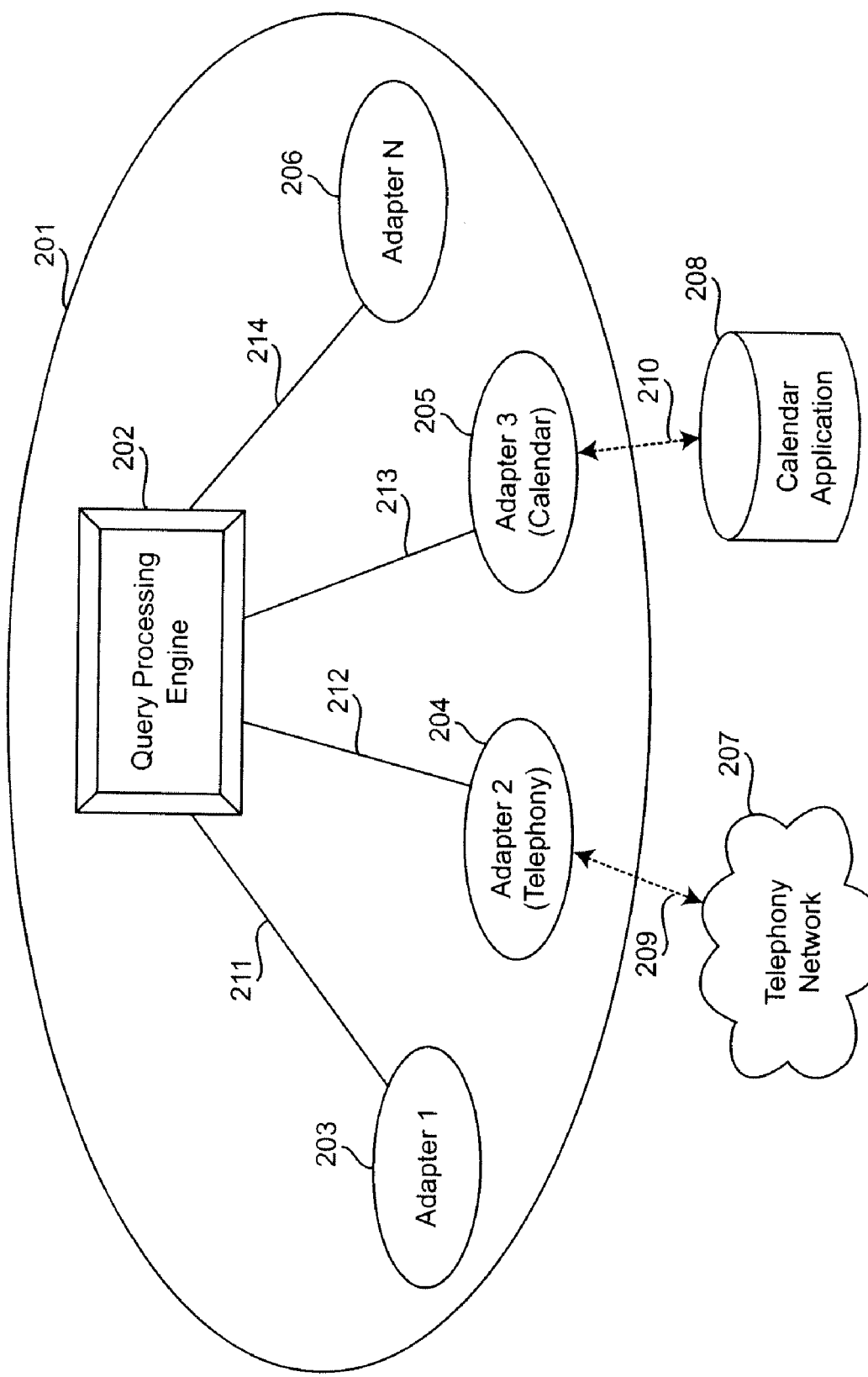
FIG. 2 shows the functional elements of the Context Information Provider Engine, which is used in the practice of this invention. The Context Information Provider Engineer includes a set of context adapters that retrieve data from external sources, applications or network elements, and a query processing engine that determines the sources or identifiers that satisfy the query predicates.

The broad functional components of the CIPE are detailed in FIG. 2. FIG. 2 shows that the overall CIPE component 201 conceptually consists of a set of context adapters 203, 204, 205, and 206 which are specialized software components that retrieve data from external sensors, sources or applications and modify their formats to fit to the generic format of the CIPE internal components. Note that the context adapters could all be implemented on one single computing node, or could be distributed among a set (potentially time-varying) of machines. For purposes of illustration, FIG. 2 shows a context adapter 204 that retrieves information about the state of various elements of the telephony network (for example, if a particular phone is busy, the called party if the phone is busy, etc.), as well as another context adapter 205 that retrieves information about the calendar (planned activity) of a person (for example, if the person is on vacation, or the next available free time). To retrieve this information, the adapters will have to appropriately interface to network components or applications that are external to CIPE. For example, the telephony adapter 204 may use telephony standard interfaces to communicate with and retrieve information 209 from the telephony network 207, while the calendar adapter 205 may retrieve calendar information via a proprietary interface 210 from the external calendar software application 208. Note that the CIPE may include specific adapters to retrieve information state from the CNAE 104 as well, since some of the context events of interest may relate to changes in the collaboration network or application itself. For example, if the CNAE refers to a telephony network supporting a conference call, the corresponding telephony adapter may be used to retrieve information about when one of the participant hangs up, or if the participant redirects a call to an alternative phone number.

The CIPE also consists of a query-processing engine QPE 202 that takes the input values from these adapters and matches these to incoming queries (from the DCE) to determine the appropriate matching individuals, data sources or device identifiers. In addition to responding to one-time queries, the QPE can also support event-based notification queries, where the querying party essentially subscribes for certain events of interest over a longer time period. The querying party and the CIPE then maintain a long-lived association for that query, with the CIPE continuously monitoring the input values from the context adapters and issuing a notification to the querying party whenever the appropriate conditions over the context value are satisfied. The logical implementation of such an event-based notification mechanism may be implemented by one or more well-known mechanisms, such as publish-subscribe, event-callbacks, message brokering etc. Similarly, the query formats over the context data, and the algorithms used by the QPE to resolve such queries to an explicit device or user identifier may also be implemented in many different ways.

The entire interaction between the DCE, CIPE and CNAE components is really triggered by the initial request from the requester, requesting the establishment of the collaborative session. FIG. 3 shows one possible logical embodiment 301 of this initial request, where the requester may specify a set of explicitly identified user or device identifiers, and a second set of context predicates that help to implicitly define a target user or individual. In this particular example, defined using a hypothetical but humanly understandable format, the requestor requires the DCE to establish a mailing list that includes the user-IDs john@xyz.com and jenny@xyz.com, as well as two users who are "managers of John who are in the same building as John", and the "designated human resource specialist for Jenny's department". Additionally, the request may also specify the logical identifier (in this case the group email id: hiring-new@xyz.com) used to represent the resulting collaborative association. The format for specifying the explicitly identified user or device identifiers may vary with the choice of different CNAEs: for example, for a voice conference, the identifiers may simply be phone numbers, while for the establishment of a dynamic mailing list, the identifiers may be email addresses. The implicitly identified users may be expressed in any specific logical format, such as, but clearly not limited to, name-value pairs over a well defined attribute space, or XML-based queries over well-defined XML schemas. On receiving such an initial request, the DCE must first resolve the implicit users to corresponding appropriate user or device identifiers. For example, the "managers of John who are in the same building" may be resolved via interaction with the CIPE to be "james@xyz.com" and "ann@xyz.com". Once these individuals are identified, the DCE will then interact with the relevant CNAE to establish the collaborative context. In our hypothetical case, this may translate into the establishment of a mailing list named "hiring-new@xyz.com", whose constituents are {john, jenny, james, ann}(xyz.com. The collaboration request may also contain a set of context predicates (illustrated under the Implicit-Termination header in FIG. 2) that define a set of conditions that are used to terminate an established collaborative association. Further use of this implicit termination condition is discussed below in conjunction with FIG. 5. The various predicates in the "implicit-participants" and "implicit-termination" fields of the request may refer to a variety of contextual data, which may be retrieved by one or more distributed or centralized context adapters in the CIPE.

Figure 4:
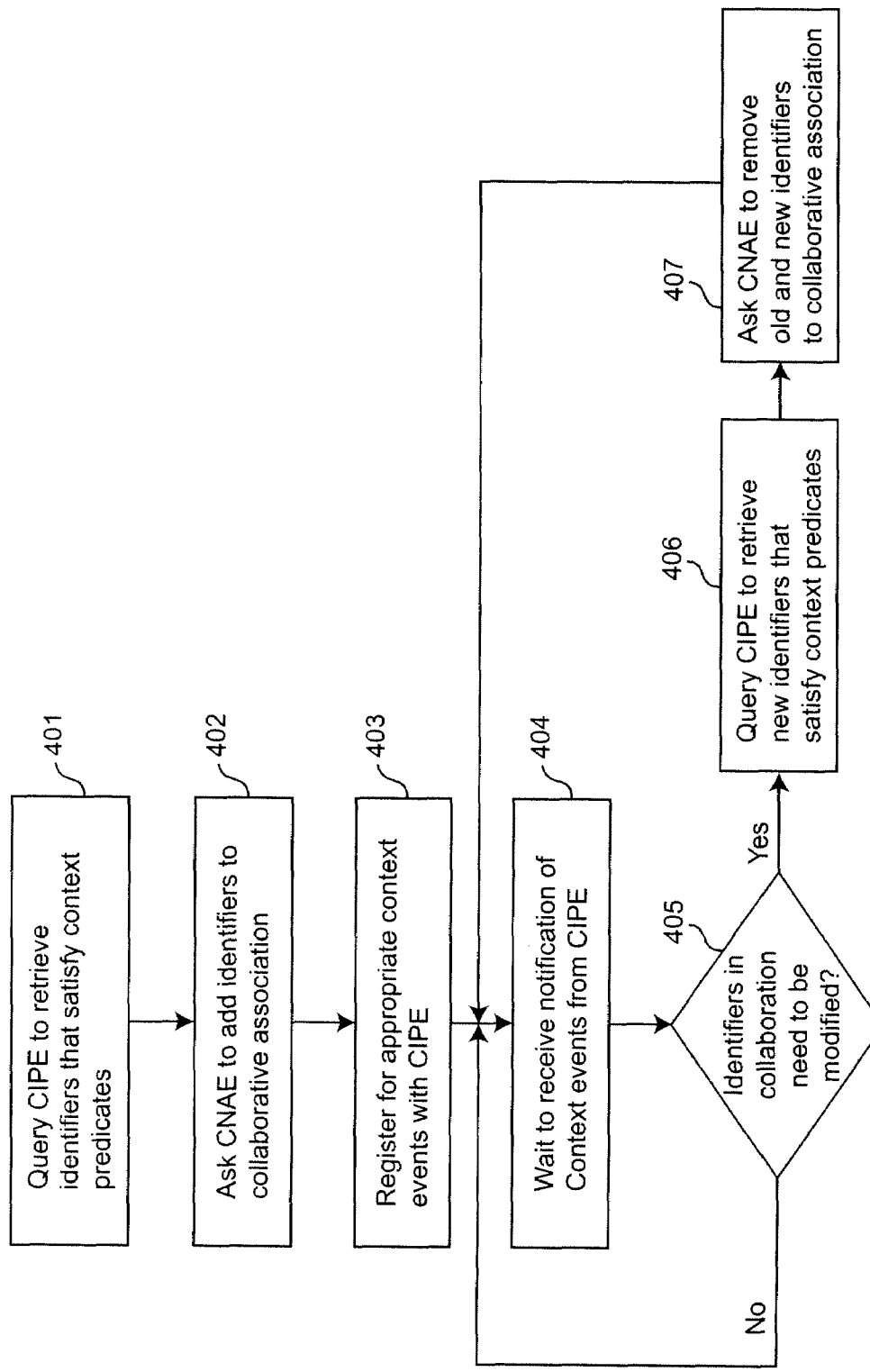
FIG. 4 shows how the Dynamic Context Enabler (DCE) can support a collaborative association where the membership changes dynamically, during the collaboration lifetime, based on changes in the state of current association participants or other contextual states.

The invention allows the context-monitoring needed for the collaborative association to be continuous, in that the set of users selected for the collaborative association need not be decided only at the initiation of the session, but may also change during the lifetime of the session, depending upon dynamic changes in the contextual data of the users. FIG. 4 describes the broad steps in the DCE involved in effecting continuous context monitoring and subsequent adjustment of users within the collaborative session. After initially querying 401 the CIPE for the identifiers of the appropriate user or user devices, the DCE entity interacts 402 with the CNAE for the initial establishment of the collaborative association. After the initial setup, the DCE also issues 403 a long-lived subscription to the CIPE, requesting the CIPE to notify it of appropriate context-related events. For example, if the original user desired the DCE to conference it to two available doctors, the DCE would first query for two doctors whose availability attribute was "true". After obtaining the identifiers (say email IDs) of the two doctors, e.g., D1 and D2, the DCE would also subscribe to appropriate events related to changes in the states of the identifiers D1 and D2. For example, the DCE could request to be notified if one of the doctors went on vacation or took a holiday, or if the email box of a doctor became full. The CIPE would then inform the DCE (via well known "callback" mechanisms) when an appropriately specified event occurred (e.g., doctor D1 roamed out of the coverage area of the hospital). After issuing the original subscription to the CIPE, the DCE would wait to receive notifications on appropriate changes in the context information of the participants. It is also possible that the DCE may register for context alerts related to people or devices not presently participating in the collaborative association. For example, a DCE wishing to connect a patient to the most senior doctor would issue a subscription to be notified if any new doctor had a seniority level exceeding that of the currently associated doctor. On receiving 404 an alert of this information, the DCE would then determine 405 if the changed context status warranted a change in the group membership of the collaborative association, or possibly in some change to the parameters of the collaboration. As an example of the latter, if the DCE receives notification that one of the participants is currently in a foreign country, it can increase the encryption level of all communications within the group to a higher level for increased security. If no changes are needed, the DCE would ignore the event notification and continue to await further notifications from the CIPE. In case some change is warranted, the DCE would then again contact 406 the CIPE to retrieve the alternative identifiers that presently satisfy the context predicates. After obtaining the fresh set of parameters, the DCE would then interact 407 with the CNAE to suitably modify the membership of the ongoing collaborative association. In case the DCE simply needs to change some parameters of the ongoing collaboration, rather than changing the membership step, it may proceed to directly interact with the CNAE, bypassing the query 406 to the CIPE.

An embodiment of the invention may use the implicit predicates not only to identify the actual participants of the collaborative association, but also to implicitly define when the collaborative association needs to be terminated. In conventional collaborative applications, the termination event either typically requires explicit manual input (an email administrator physically removes a mailing list) or is generated due to a statically configured event that can be detected within the CNAE (e.g., terminate the conference call in 10 minutes, or when user A hangs up the phone). In the present invention, the termination event may itself be specified as a set of predicates over contextual attributes; for example, one may specify that the voice conference can be ended when "the patient has reached the hospital".

Figure 5:
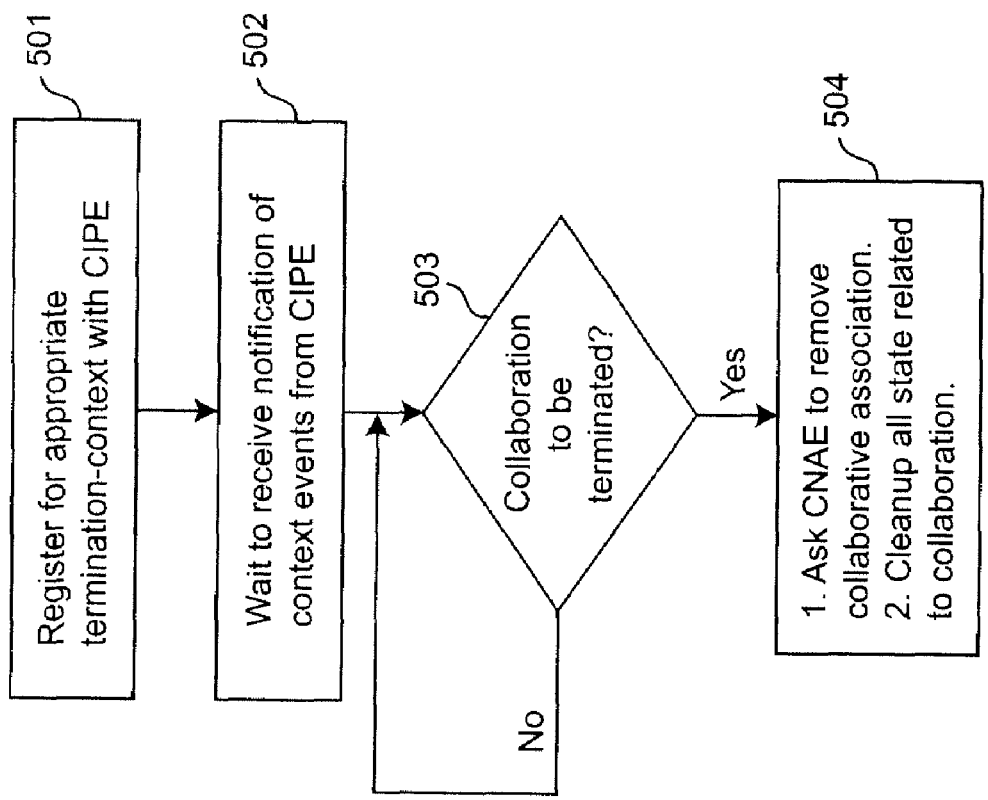
FIG. 5 shows the steps by which the set of implicit termination predicates, specified in the initial collaboration establishment request from the requester, may be used to automatically terminate the collaboration whenever the appropriate conditions are met. This facility allows the establishment and removal of dynamic and transient collaborative associations with a minimum of human intervention.

FIG. 5 shows the major logical steps of the DCE in enacting a context-event driven termination. To support these steps, the requester should have specified an appropriate "termination event" at the beginning, or an intermediate point, of the collaborative session. For example, in FIG. 2, the requester specified that the collaboration be terminated when status of the job search (with the ID equal to "finance-0101" changes to "filled"). The DCE then makes 501 a subscription for the context-related event with the CIPE, which then continually monitors its adapters to decide when changes in the underlying contextual data match the described predicate. When the predicates are matched, the CIPE generates an event to the DCE, which has been waiting 502 to receive this notification. After determining 503 that the resulting event should indeed result in the termination of the collaborative context, the DCE will then interact 504 with the CNAE to terminate the collaborative session. As part of this termination session, the CIPE and the CNAE may be required to perform additional bookkeeping or resource cleanup. For example, for a dynamically established email list, the email application can then remove the corresponding email list.

While the invention has been described in terms of its preferred embodiments, those skilled in the art will recognize that the invention can be practiced with modification within the spirit and scope of the appended claims.

What we claim as new and desire to secure by Letters Patent is as follows:

1. A non-transitory computer readable media encoded with a software or firmware program comprising encoded instructions for performing a process for criteria-based establishment and/or termination of a collaborative session among a group of dynamically varying users which includes the steps of:

maintaining, for each of a plurality of users, a set of contextual attributes, said set including an availability attribute representing an availability of the user, a skill attribute representing skill of the user, and a location attribute representing a geographic location of the associated user, said maintaining including repeatedly updating the values of the contextual attributes in accordance with updates in the contexts represented by the attributes;

receiving a user-entered request to establish a collaborative session, said request specifying a set of predicates in terms of specific values of contextual attributes from among said contextual attributes required for users to participate in the requested collaborative session, and a termination predicate specifying a collaborative session termination event;

querying said sets of contextual attributes to identify each set of contextual attributes having current values that satisfy said set of predicates;

establishing and maintaining a collaborative association among the users having sets of contextual attributes identified by said querying as satisfying said user-entered request, a group of dynamically varying users identified according to an explicit set of individual or device predicates;

repeating said querying while maintaining said collaborative session and, in response to said querying identifying another of said sets of contextual attributes as satisfying said set of predicates, adding the user associated with said another set of contextual attributes to said collaborative session;

detecting an occurrence of the event identified by said termination predicate; and in response to the detecting, terminating the collaborative event.

2. The non-transitory computer-readable, media of claim 1, wherein encoded instructions for said user input request includes encoded instructions which enable input of an identifier explicitly identifying at least one said users, and wherein said instructions which enable querying includes encoded instructions which enable identifying whether the user is a member of the collaborative session based on the value of the availability attribute of the user.

* * * * *